US010587894B2

(12) United States Patent
Yoo et al.

(10) Patent No.: US 10,587,894 B2
(45) Date of Patent: Mar. 10, 2020

(54) METHOD AND DEVICE FOR ENCODING/DECODING 3D VIDEO

(71) Applicant: LG ELECTRONICS INC., Seoul (KR)

(72) Inventors: Sunmi Yoo, Seoul (KR); Jungdong Seo, Seoul (KR); Junghak Nam, Seoul (KR); Sehoon Yea, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/510,500

(22) PCT Filed: Sep. 7, 2015

(86) PCT No.: PCT/KR2015/009422
§ 371 (c)(1),
(2) Date: Mar. 10, 2017

(87) PCT Pub. No.: WO2016/056754
PCT Pub. Date: Apr. 14, 2016

(65) Prior Publication Data
US 2017/0289573 A1 Oct. 5, 2017

Related U.S. Application Data

(60) Provisional application No. 62/061,178, filed on Oct. 8, 2014.

(51) Int. Cl.
*H04N 19/597* (2014.01)
*H04N 19/176* (2014.01)
(Continued)

(52) U.S. Cl.
CPC ......... *H04N 19/597* (2014.11); *H04N 19/105* (2014.11); *H04N 19/139* (2014.11);
(Continued)

(58) Field of Classification Search
CPC ........................... H04N 19/597; H04N 19/176
See application file for complete search history.

(56) References Cited

U.S. PATENT DOCUMENTS 9,325,990 B2 * 4/2016 Chen ..................... H04N 19/105
9,503,702 B2 * 11/2016 Chen ..................... H04N 19/597
(Continued)

FOREIGN PATENT DOCUMENTS

JP    2000125305 A    4/2000
KR    20080007069 A    1/2008
(Continued)

OTHER PUBLICATIONS

NPL: Depth-based Coding of MVD Data for 3D Video Extension of H.264 AVC; Apr. 2013.*
(Continued)

*Primary Examiner* — Luis Perez-Fuentes
(74) *Attorney, Agent, or Firm* — Dentons US LLP

(57) ABSTRACT

The present invention relates to a device and a method for coding a multi-view video, a residual prediction method, according to the present invention, comprising the steps of: deriving a disparity vector of a current block; performing residual prediction on the current block on the basis of the disparity vector; and generating a residual prediction sample, wherein the disparity vector is not derived on the basis of a neighboring block of the current block, but is derived from a preset default vector. According to the present invention, the effect of prediction may be increased by performing residual prediction on the current block according to a certain condition, not only when the disparity vector is induced but also when the disparity vector is not induced from the neighboring block of the current block.

14 Claims, 11 Drawing Sheets

(51) Int. Cl.
  *H04N 19/70* (2014.01)
  *H04N 19/105* (2014.01)
  *H04N 19/139* (2014.01)
  *H04N 19/159* (2014.01)
  *H04N 19/52* (2014.01)
  *H04N 19/513* (2014.01)

(52) U.S. Cl.
  CPC ......... *H04N 19/159* (2014.11); *H04N 19/176* (2014.11); *H04N 19/52* (2014.11); *H04N 19/521* (2014.11); *H04N 19/70* (2014.11)

(56) References Cited

U.S. PATENT DOCUMENTS

| | | | | |
|---|---|---|---|---|
| 9,503,720 | B2* | 11/2016 | Chen | H04N 19/597 |
| 9,516,332 | B2* | 12/2016 | Kang | H04N 19/597 |
| 9,596,448 | B2* | 3/2017 | Thirumalai | H04N 13/161 |
| 9,609,347 | B2* | 3/2017 | Thirumalai | H04N 19/597 |
| 9,615,090 | B2* | 4/2017 | Zhang | H04N 19/597 |
| 9,900,576 | B2* | 2/2018 | Thirumalai | H04N 13/161 |
| 9,930,363 | B2* | 3/2018 | Rusanovskyy | H04N 19/597 |
| 9,948,915 | B2* | 4/2018 | Chen | H04N 19/597 |
| 9,967,592 | B2* | 5/2018 | Zhang | H04N 19/52 |
| 10,257,531 | B2* | 4/2019 | Lee | H04N 19/46 |
| 2013/0258052 | A1* | 10/2013 | Li | H04N 13/161 348/43 |
| 2014/0176674 | A1 | 6/2014 | Kang et al. | |
| 2015/0195572 | A1* | 7/2015 | Chen | H04N 19/517 375/240.16 |
| 2015/0271524 | A1* | 9/2015 | Zhang | H04N 19/597 375/240.16 |
| 2015/0358636 | A1* | 12/2015 | Lin | H04N 19/00 375/240.16 |
| 2016/0182884 | A1* | 6/2016 | Lin | H04N 19/597 375/240.03 |
| 2017/0359577 | A1* | 12/2017 | Park | H04N 19/30 |

FOREIGN PATENT DOCUMENTS

| | | |
|---|---|---|
| KR | 20140049498 A | 4/2014 |
| WO | 2014075625 A1 | 5/2014 |

OTHER PUBLICATIONS

Depth-based Coding of MVD Data for 3D Video Extension of H.264 AVC; Rusanovskyy; Apr. 2013.*
CE4 Further improvement on advanced residual prediction; Zhang; Nov. 2013.*
CE4 Advanced residual prediction for multiview coding; Zhang; Apr. 2013.*
Working Draft 1-3D-HEVC Test Model 1; Jul. 2012 (Year: 2012).*
Working Draft 3 of High Tefficiencly video coding; Wiegand; 2011.*
Depth-based coding of MVD Data for 3D Video Extension of H.264 AVC; Apr. 2013. (Year: 2013).*
Standardized Extensions of High Efficiency Video Coding HEVC; Sullivan; 2013. (Year: 2013).*
Ce2—Cu based disparity vector derivation in 3D-HEVC; Kang; Apr. 2013. (Year: 2013).*
NPL google search; 2019. (Year: 2019).*

* cited by examiner

METHOD AND DEVICE FOR ENCODING/DECODING 3D VIDEO

CROSS-REFERENCE TO RELATED APPLICATIONS

This application is the National Stage filing under 35 U.S.C. 371 of International Application No. PCT/KR2015/009422, filed on Sep. 7, 2015, which claims the benefit of U.S. Provisional Application No. 62/061,178 filed on Oct. 8, 2014, the contents of which are all hereby incorporated by reference herein in their entirety

BACKGROUND OF THE INVENTION

Field of the invention

The present invention relates to a technology associated with video coding, and more particularly, to coding of a 3D video picture.

Related Art

In recent years, demands for a high-resolution and high-quality video have increased in various fields of applications. However, the higher the resolution and quality video data becomes, the greater the amount of video data becomes.

Accordingly, when video data is transferred using media such as existing wired or wireless broadband lines or video data is stored in existing storage media, the transfer cost and the storage cost thereof increase. High-efficiency video compressing techniques can be used to effectively transfer, store, and reproduce high-resolution and high-quality video data.

On the other hand, with realization of capability of processing a high-resolution/high-capacity video, digital broadcast services using a 3D video have attracted attention as a next-generation broadcast service. A 3D video can provide a sense of realism and a sense of immersion using multi-view channels.

A 3D video can be used in various fields such as free viewpoint video (FVV), free viewpoint TV (FTV), 3DTV, surveillance, and home entertainments.

Unlike a single-view video, a 3D video using multi-views have a high correlation between views having the same picture order count (POC). Since the same scene is shot with multiple neighboring cameras, that is, multiple views, multi-view videos have almost the same information except for a parallax and a slight illumination difference and thus difference views have a high correlation therebetween.

Accordingly, the correlation between different views can be considered for coding/decoding a multi-view video, and information need for coding and/or decoding of a current view can be obtained. For example, a block to be decoded in a current view can be predicted or decoded with reference to a block in another view.

SUMMARY OF THE INVENTION

The present invention provides a method and apparatus for predicting a current block in 3 dimensional (3D) video coding.

The present invention provides a method and an apparatus of residual prediction in the 3D video coding.

The present invention provides a method and an apparatus of residual prediction based on a disparity vector in the 3D video coding.

The present invention provides a method and an apparatus of residual prediction for a current block when the disparity vector is not induced from a neighboring block of a current block.

In an aspect, a residual prediction method is provided. The residual prediction method includes: deriving a disparity vector of a current block; performing residual prediction on the current block on the basis of the disparity vector; and generating a residual prediction sample, and the disparity vector is not derived on the basis of a neighboring block of the current block, but is derived from a preset default vector.

In another aspect, a residual prediction apparatus is provided. The residual prediction apparatus includes: a prediction unit deriving a disparity vector for a current block and generating a residual prediction sample by performing residual prediction of the current block based on the disparity vector, and the prediction unit does not derive the disparity vector on the basis of a neighboring block of the current block, but derives the disparity vector from a preset default vector.

According to the present invention, a current block in a current picture is predicted in 3D video coding to increase coding efficiency and decrease a data amount to be transmitted.

According to the present invention, residual prediction is performed in the 3D video coding to increase prediction efficiency and the coding efficiency.

According to the present invention, in a case where a disparity vector is not induced as well as a case where the disparity vector is induced from a neighboring block of the current block, the residual prediction for the current block is performed to increase a prediction effect.

DESCRIPTION OF EXEMPLARY EMBODIMENTS

Figure 1:
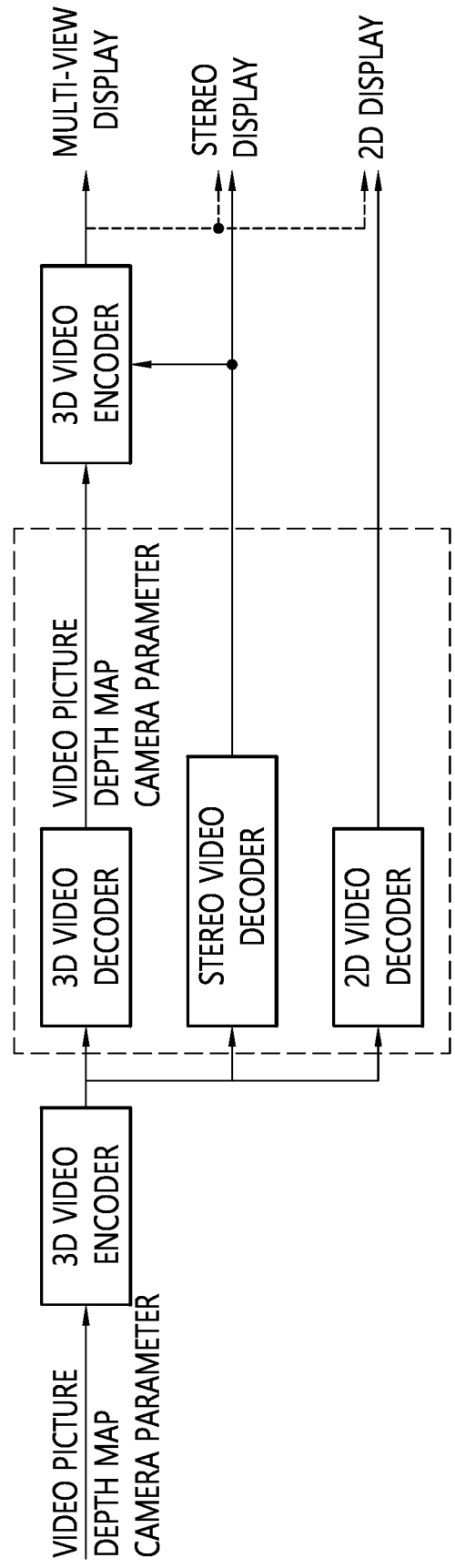
FIG. 1 briefly illustrates a 3 dimensional (3D) video encoding and decoding process to which the present invention is applicable.

The invention may be variously modified in various forms and may have various embodiments, and specific embodiments thereof will be illustrated in the drawings and described in detail. However, these embodiments are not intended for limiting the invention. Terms used in the below description are used to merely describe specific embodiments, but are not intended for limiting the technical spirit of the invention. An expression of a singular number includes an expression of a plural number, so long as it is clearly read differently. Terms such as "include" and "have" in this description are intended for indicating that features, numbers, steps, operations, elements, components, or combinations thereof used in the below description exist, and it should be thus understood that the possibility of existence or addition of one or more different features, numbers, steps, operations, elements, components, or combinations thereof is not excluded.

On the other hand, elements of the drawings described in the invention are independently drawn for the purpose of convenience of explanation on different specific functions, and do not mean that the elements are embodied by independent hardware or independent software. For example, two or more elements out of the elements may be combined to form a single element, or one element may be split into plural elements. Embodiments in which the elements are combined and/or split belong to the scope of the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, a pixel or a pel may mean a minimum unit constituting one picture (or image). Further, a 'sample' may be used as a term representing a value of a specific pixel. The sample may generally indicate a value of the pixel, may represent only a pixel value of a luma component, and may represent only a pixel value of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a 3 dimensional (3D) video encoding and decoding process to which the present invention is applicable.

Referring to FIG. 1, a 3D video encoder may encode a video picture, a depth map, and a camera parameter to output a bitstream.

The depth map may be constructed of distance information (depth information) between a camera and a subject with respect to a picture of a corresponding video picture (texture picture). For example, the depth map may be an image obtained by normalizing depth information according to a bit depth. In this case, the depth map may be constructed of depth information recorded without a color difference representation. The depth map may be called a depth map picture or a depth picture.

In general, a distance to the subject and a disparity are inverse proportional to each other. Therefore, disparity information indicating an inter-view correlation may be derived from the depth information of the depth map by using the camera parameter.

A bitstream including the depth map and the camera parameter together with a typical color image, i.e., a video picture (texture picture), may be transmitted to a decoder through a network or a storage medium.

From a decoder side, the bitstream may be received to reconstruct a video. If a 3D video decoder is used in the decoder side, the 3D video decoder may decode the video picture, the depth map, and the camera parameter from the bitstream. Views required for a multi-view display may be synthesized on the basis of the decoded video picture, depth map, and camera parameter. In this case, if a display in use is a stereo display, a 3D image may be displayed by using pictures for two views among reconstructed multi-views.

If a stereo video decoder is used, the stereo video decoder may reconstruct two pictures to be incident to both eyes from the bitstream. In a stereo display, a stereoscopic image may be displayed by using a view difference or disparity of a left image which is incident to a left eye and a right image which is incident to a right eye. When a multi-view display is used together with the stereo video decoder, a multi-view may be displayed by generating different views on the basis of reconstructed two pictures.

If a 2D decoder is used, a 2D image may be reconstructed to output the image to a 2D display. If the 2D display is used but the 3D video decoder or the stereo video decoder is used as the decoder, one of the reconstructed images may be output to the 2D display.

In the structure of FIG. 1, a view synthesis may be performed in a decoder side or may be performed in a display side. Further, the decoder and the display may be one device or may be separate devices.

Although it is described for convenience in FIG. 1 that the 3D video decoder and the stereo video decoder and the 2D video decoder are separate decoders, one decoding device may perform all of the 3D video decoding, the stereo video decoding, and the 2D video decoding. Further, the 3D video decoding device may perform the 3D video decoding, the stereo video decoding device may perform the stereo video decoding, and the 2D video decoding device may perform the 2D video decoding. Further, the multi-view display may output the 2D video or may output the stereo video.

Figure 2:
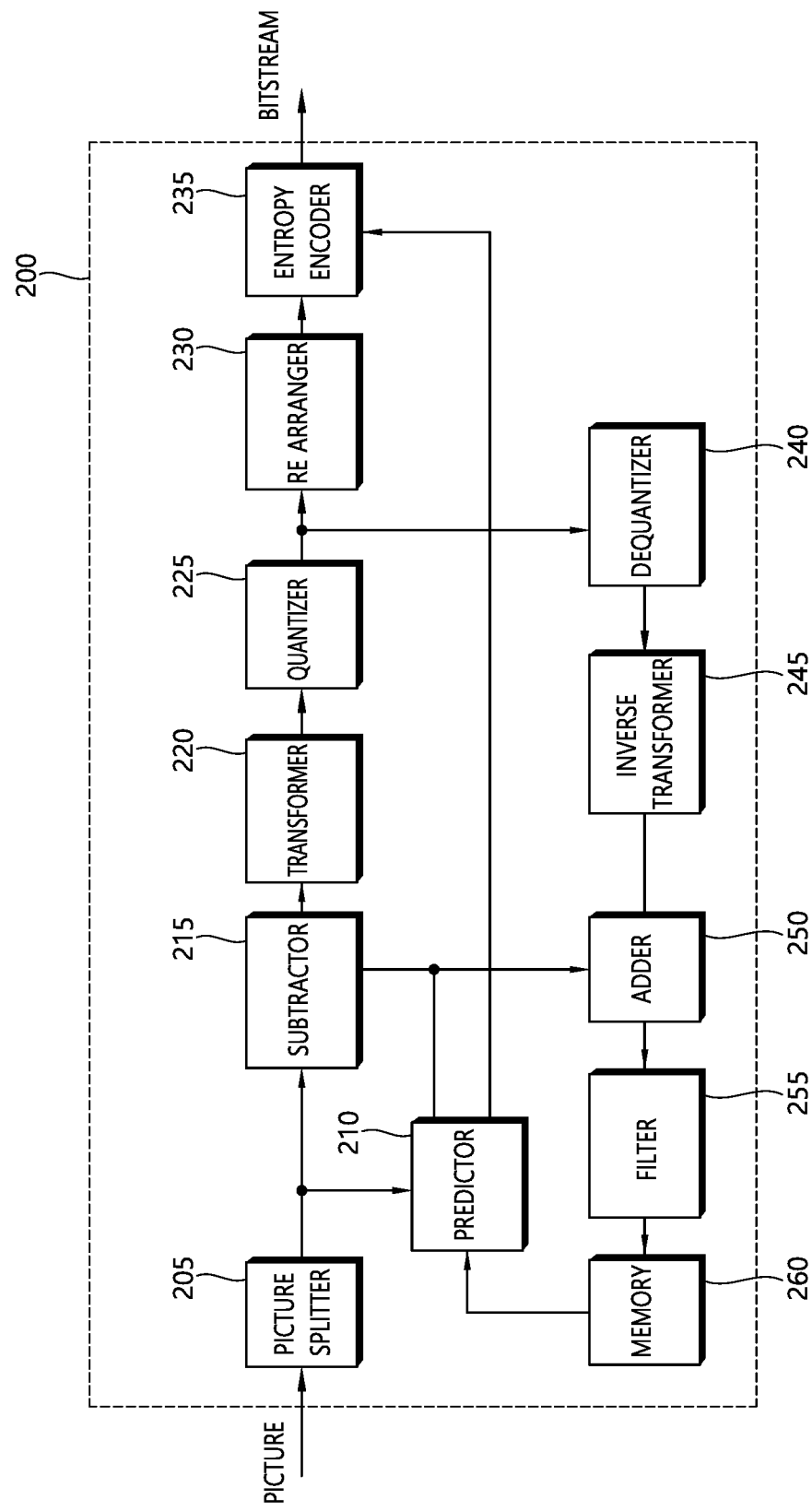
FIG. 2 briefly illustrates a structure of a video encoding device to which the present invention is applicable.

FIG. 2 briefly illustrates a structure of a video encoding device to which the present invention is applicable.

Referring to FIG. 2, a video encoding device 200 includes a picture splitter 205, a predictor 210, a subtractor 215, a transformer 220, a quantizer 225, a re-arranger 230, an entropy encoder 235, a dequantizer 240, an inverse transformer 245, an adder 250, a filter 255, and a memory 260.

The picture splitter 205 may split an input picture into at least one processing unit block. In this case, the processing unit block may be a coding unit block, a prediction unit block, or a transform unit block. As a unit block of coding, the coding unit block may be split from a largest coding unit block according to a quad-tree structure. As a block partitioned from the coding unit block, the prediction unit block may be a unit block of sample prediction. In this case, the prediction unit block may be divided into sub blocks. The transform unit block may be split from the coding unit block according to the quad-tree structure, and may be a unit block for deriving according to a transform coefficient or a unit block for deriving a residual signal from the transform coefficient.

Hereinafter, the coding unit block may be called a coding block (CB) or a coding unit (CU), the prediction unit block may be called a prediction block (PB) or a prediction unit (PU), and the transform unit block may be called a transform block (TB) or a transform unit (TU).

The prediction block or the prediction unit may mean a specific area having a block shape in a picture, and may include an array of a prediction sample. Further, the transform block or the transform unit may mean a specific area having a block shape in a picture, and may include a transform coefficient or an array of a residual sample.

The predictor 210 may perform prediction on a processing target block (hereinafter, a current block), and may generate a prediction block including prediction samples for the current block. A unit of prediction performed in the predictor 210 may be a coding block, or may be a transform block, or may be a prediction block.

The predictor 210 may determine whether intra prediction is applied or inter prediction is applied to the current block. For example, the predictor 210 may determine whether the intra prediction or the inter prediction is applied in unit of CU.

In case of the intra prediction, the predictor 210 may derive a prediction sample for the current block on the basis of a reference sample outside the current block in a picture to which the current block belongs (hereinafter, a current picture). In this case, the predictor 210 may derive the prediction sample on the basis of an average or interpolation of neighboring reference samples of the current block (case (i)), or may derive the prediction sample on the basis of a reference sample existing in a specific (prediction) direction as to a prediction sample among the neighboring reference samples of the current block (case (ii)). The case (i) may be called a non-directional mode, and the case (ii) may be called a directional mode. The predictor 210 may determine the prediction mode to be applied to the current block by using the prediction mode applied to the neighboring block.

In case of the inter prediction, the predictor 210 may derive the prediction sample for the current block on the basis of a sample specified by a motion vector on a reference picture. The predictor 210 may derive the prediction sample for the current block by applying any one of a skip mode, a merge mode, and a motion vector prediction (MVP) mode. In case of the skip mode and the merge mode, the predictor 210 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter prediction, the neighboring block includes a spatial neighboring block existing in the current picture and a temporal neighboring block existing in the reference picture. The reference picture including the temporal neighboring block may also be called a collocated picture (colPic). Motion information may include the motion vector and the reference picture. If the motion information of the temporal neighboring block is used in the skip mode and the merge mode, a top picture on a reference picture list may be used as the reference picture.

A multi-view may be divided into an independent view and a dependent view. In case of encoding for the independent view, the predictor 210 may perform not only inter prediction but also inter-view prediction.

The predictor 210 may configure the reference picture list by including pictures of different views. For the inter-view prediction, the predictor 210 may derive a disparity vector. Unlike in the motion vector which specifies a block corresponding to the current block in a different picture in the current view, the disparity vector may specify a block corresponding to the current block in another view of the same access unit (AU) as the current picture. In the multi-view, for example, the AU may include video pictures and depth maps corresponding to the same time instance. Herein, the AU may mean a set of pictures having the same picture order count (POC). The POC corresponds to a display order, and may be distinguished from a coding order.

The predictor 210 may specify a depth block in a depth view on the basis of the disparity vector, and may perform merge list configuration, an inter-view motion prediction, residual prediction, illumination compensation (IC), view synthesis, or the like.

The disparity vector for the current block may be derived from a depth value by using a camera parameter, or may be derived from a motion vector or disparity vector of a neighboring block in a current or different view.

For example, the predictor 210 may add, to the merging candidate list, an inter-view merging candidate (IvMC) corresponding to temporal motion information of a reference view, an inter-view disparity vector candidate (IvDC) corresponding to a disparity vector, a shifted IvMC derived by a shift of a disparity vector, a texture merging candidate (T) derived from a corresponding texture picture when a current block is a block on a depth map, a disparity derived merging candidate (D) derived by using a disparity from the texture merging candidate, a view synthesis prediction candidate (VSP) derived on the basis of view synthesis, or the like.

In this case, the number of candidates included in the merging candidate list to be applied to the dependent view may be limited to a specific value.

Further, the predictor 210 may predict the motion vector of the current block on the basis of the disparity vector by applying the inter-view motion vector prediction. In this case, the predictor 210 may derive the disparity vector on the basis of a conversion of a largest depth value in a corresponding depth block. When a position of a reference sample in a reference view is specified by adding the disparity vector to a sample position of the current block in the reference view, a block including the reference sample may be used as a reference block. The predictor 210 may use the motion vector of the reference block as a candidate motion parameter of the current block or a motion vector predictor candidate, and may use the disparity vector as a candidate disparity vector for a disparity compensated prediction (DCP).

The subtractor 215 generates a residual sample which is a difference between an original sample and a prediction sample. If the skip mode is applied, the residual sample may not be generated as described above.

The transformer 220 transforms a residual sample in unit of a transform block to generate a transform coefficient. The quantizer 225 may quantize the transform coefficients to generate a quantized transform coefficient.

The re-arranger 230 re-arranges the quantized transform coefficients. The re-arranger 230 may re-arrange the quantized transform coefficients having a block shape in a 1D vector form by using a scanning method.

The entropy encoder 235 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 235 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The adder 250 adds the residual sample and the prediction sample to reconstruct the picture. The residual sample and the prediction sample may be added in unit of blocks to generate a reconstruction block. Although it is described herein that the adder 250 is configured separately, the adder 250 may be a part of the predictor 210.

The filter 255 may apply deblocking filtering and/or a sample adaptive offset to the reconstructed picture. An artifact of a block boundary in the reconstructed picture or a distortion in a quantization process may be corrected through the deblocking filtering and/or the sample adaptive offset. The sample adaptive offset may be applied in unit of samples, and may be applied after a process of the deblocking filtering is complete.

The memory 260 may store the reconstructed picture or information required for encoding/decoding. For example, the memory 260 may store (reference) pictures used in inter prediction/inter-view prediction. In this case, pictures used in the inter prediction/inter-view prediction may be designated by a reference picture set or a reference picture list.

Although it is described herein that one encoding device encodes an independent view and a dependent view, this is for convenience of explanation. Thus, a separate encoding device may be configured for each view, or a separate internal module (e.g., a prediction module for each view) may be configured for each view.

Figure 3:
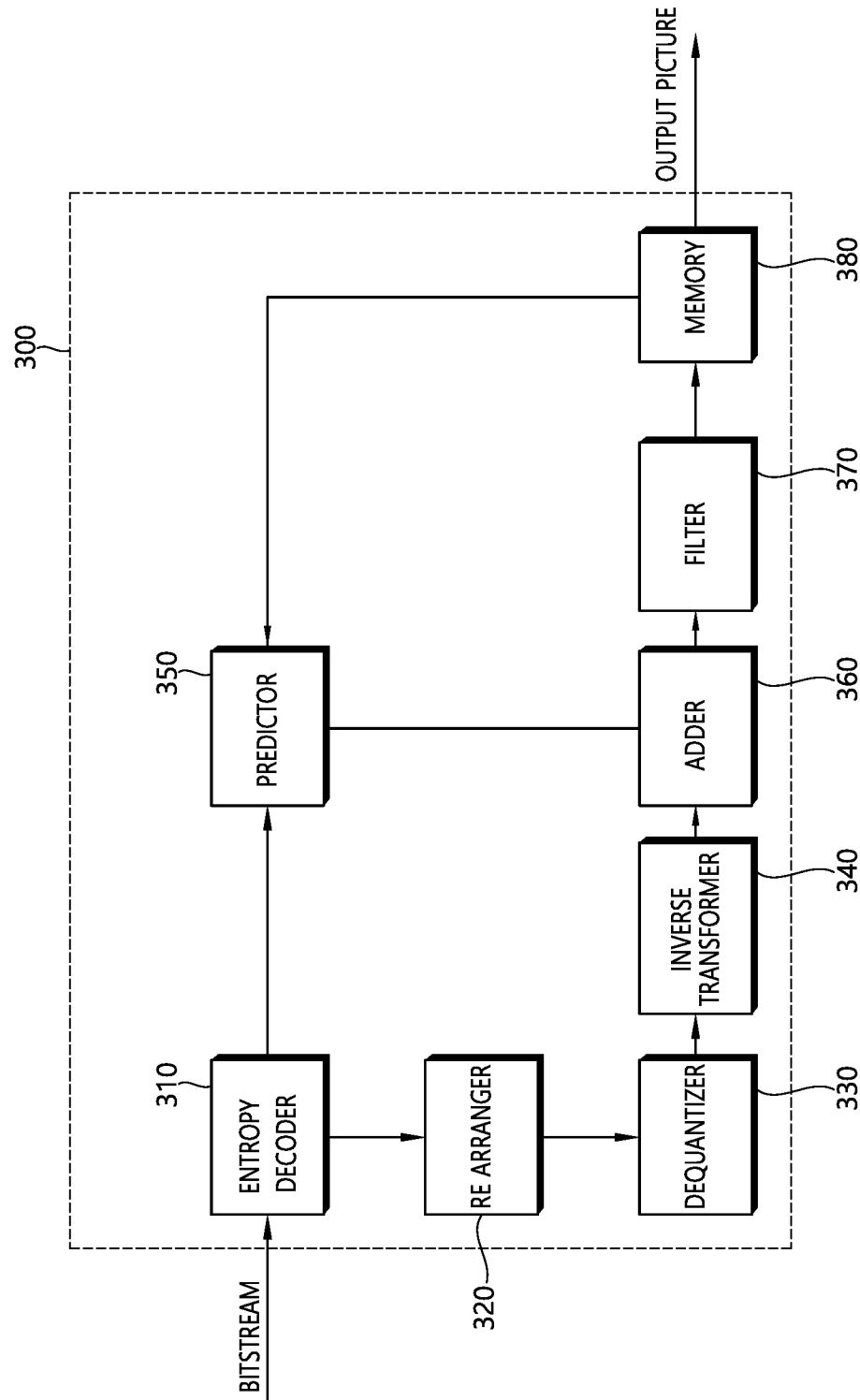
FIG. 3 briefly illustrates a structure of a video decoding device to which the present invention is applicable.

FIG. 3 briefly illustrates a structure of a video decoding device to which the present invention is applicable.

Referring to FIG. 3, a video decoding device 300 includes an entropy decoder 310, a re-arranger 320, a dequantizer 330, an inverse transformer 340, a predictor 350, an adder 360, a filter 370, and a memory 380.

When a bitstream including video information is input, the video decoding device 300 may reconstruct a video in association with a process by which video information is processed in the video encoding device.

For example, the video decoding device 300 may perform video decoding by using a processing unit applied in the video encoding device. Therefore, the processing unit block of video decoding may be a coding unit block, a prediction unit block, or a transform unit block. As a unit block of decoding, the coding unit block may be split according to a quad tree structure from a largest coding unit block. As a block partitioned from the coding unit block, the prediction unit block may be a unit block of sample prediction. In this case, the prediction unit block may be divided into sub blocks. As a coding unit block, the transform unit block may be split according to the quad tree structure, and may be a unit block for deriving a transform coefficient or a unit block for deriving a residual signal from the transform coefficient.

The entropy decoder 310 may parse the bitstream to output information required for video reconstruction or picture reconstruction. For example, the entropy decoder 310 may decode information in the bitstream on the basis of a coding method such as exponential Golomb encoding, CAVLC, CABAC, or the like, and may output a value of a syntax element required for video reconstruction and a quantized value of a transform coefficient regarding a residual.

If a plurality of views are processed to reproduce a 3D video, the bitstream may be input for each view. Alternatively, information regarding each view may be multiplexed in the bitstream. In this case, the entropy decoder 310 may de-multiplex the bitstream to parse it for each view.

The re-arranger 320 may re-arrange quantized transform coefficients in a form of a 2D block. The re-arranger 320 may perform re-arrangement in association with coefficient scanning performed in an encoding device.

The dequantizer 330 may de-quantize the quantized transform coefficients on the basis of a (de)quantization parameter to output a transform coefficient. In this case, information for deriving a quantization parameter may be signaled from the encoding device.

The inverse transformer 340 may inverse-transform the transform coefficients to derive residual samples.

The predictor 350 may perform prediction on a current block, and may generate a prediction block including prediction samples for the current block. A unit of prediction performed in the predictor 350 may be a coding block or may be a transform block or may be a prediction block.

The predictor 350 may determine whether to apply intra prediction or inter prediction. In this case, a unit for determining which one will be used between the intra prediction and the inter prediction may be different from a unit for generating a prediction sample. In addition, a unit for generating the prediction sample may also be different in the inter prediction and the intra prediction. For example, which one will be applied between the inter prediction and the intra prediction may be determined in unit of CU. Further, for example, in the inter prediction, the prediction sample may be generated by determining the prediction mode in unit of PU, and in the intra prediction, the prediction sample may be generated in unit of TU by determining the prediction mode in unit of PU.

In case of the intra prediction, the predictor 350 may derive a prediction sample for a current block on the basis of a neighboring reference sample in a current picture. The predictor 350 may derive the prediction sample for the current block by applying a directional mode or a non-directional mode on the basis of the neighboring reference sample of the current block. In this case, a prediction mode to be applied to the current block may be determined by using an intra prediction mode of a neighboring block.

In case of the inter prediction, the predictor 350 may derive the prediction sample for the current block on the basis of a sample specified on a reference picture by a motion vector on the reference picture. The predictor 350 may derive the prediction sample for the current block by applying any one of a skip mode, a merge mode, and an MVP mode.

In case of the skip mode and the merge mode, motion information of the neighboring block may be used as motion information of the current block. In this case, the neighboring block may include a spatial neighboring block and a temporal neighboring block.

The predictor 350 may construct a merging candidate list by using motion information of an available neighboring block, and may use information indicated by a merge index on the merging candidate list as a motion vector of the current block. The merge index may be signaled from the encoding device. The motion information may include the motion vector and the reference picture. When motion information of the temporal neighboring block is used in the skip mode and the merge mode, a highest picture on the reference picture list may be used as the reference picture.

In case of the skip mode, unlike in the merge mode, a difference (residual) between the prediction sample and the original sample is not transmitted.

In case of the MVP mode, the motion vector of the current block may be derived by using the motion vector of the neighboring block as a motion vector predictor. In this case, the neighboring block may include a spatial neighboring block and a temporal neighboring block.

In case of the dependent view, the predictor 350 may perform inter-view prediction. In this case, the predictor 350 may configure the reference picture list by including pictures of different views.

For the inter-view prediction, the predictor 350 may derive a disparity vector. The predictor 350 may specify a depth block in a depth view on the basis of the disparity vector, and may perform merge list configuration, an inter-view motion prediction, residual prediction, illumination compensation (IC), view synthesis, or the like.

The disparity vector for the current block may be derived from a depth value by using a camera parameter, or may be derived from a motion vector or disparity vector of a neighboring block in a current or different view. The camera parameter may be signaled from the encoding device.

When the merge mode is applied to the current block of the dependent view, the predictor 350 may add, to the merging candidate list, an IvMC corresponding to temporal motion information of a reference view, an IvDC corresponding to a disparity vector, a shifted IvMC derived by a shift of a disparity vector, a texture merging candidate (T) derived from a corresponding texture picture when a current block is a block on a depth map, a disparity derived merging candidate (D) derived by using a disparity from the texture merging candidate, a view synthesis prediction candidate (VSP) derived on the basis of view synthesis, or the like.

In this case, the number of candidates included in the merging candidate list to be applied to the dependent view may be limited to a specific value.

Further, the predictor 350 may predict the motion vector of the current block on the basis of the disparity vector by applying the inter-view motion vector prediction. In this case, the predictor 350 may use a block in a reference view specified by the disparity vector as a reference block. The predictor 350 may use the motion vector of the reference block as a candidate motion parameter or a motion vector predictor candidate of the current block, and may use the disparity vector as a candidate vector for disparity compensated prediction (DCP).

The adder 360 may add the residual sample and the prediction sample to reconstruct the current block or the current picture. The adder 360 may add the residual sample and the prediction sample in unit of blocks to reconstruct the current picture. When the skip mode is applied, a residual is not transmitted, and thus the prediction sample may be a reconstruction sample. Although it is described herein that the adder 360 is configured separately, the adder 360 may be a part of the predictor 350.

The filter 370 may apply de-blocking filtering and/or a sample adaptive offset to the reconstructed picture. In this case, the sample adaptive offset may be applied in unit of samples, and may be applied after de-blocking filtering.

The memory 380 may store a reconstructed picture and information required in decoding. For example, the memory 380 may store pictures used in inter prediction/inter-view prediction. In this case, pictures used in the inter prediction/inter-view prediction may be designated by a reference picture set or a reference picture list. The reconstructed picture may be used as a reference picture for a different picture.

Further, the memory 380 may output the reconstructed picture according to an output order. Although not shown, an output unit may display a plurality of different views to reproduce a 3D image.

Although it is described in the example of FIG. 3 that an independent view and a dependent view are decoded in one decoding device, this is for exemplary purposes only, and the present invention is not limited thereto. For example, each decoding device may operate for each view, and an internal module (for example, a prediction module) may be provided in association with each view in one decoding device.

Multi-view video coding may perform coding on a current picture by using decoding data of a different view belonging to the same access unit (AU) as the current picture to increase video coding efficiency for the current view.

In the multi-view video decoding, views may be coded in unit of AU, and pictures may be coded in unit of views. Coding is performed between views according to a determined order. A view which can be coded without a reference of another view may be called a base view or an independent view. Further, a view which can be coded with reference to an independent view or another view after the independent view is coded may be called a dependent view or an extended view. Further, if the current view is a dependent view, a view used as a reference in coding of the current view may be called a reference view. Herein, coding of a view includes coding of a video picture, a depth map, or the like belonging to the view.

Figure 4:
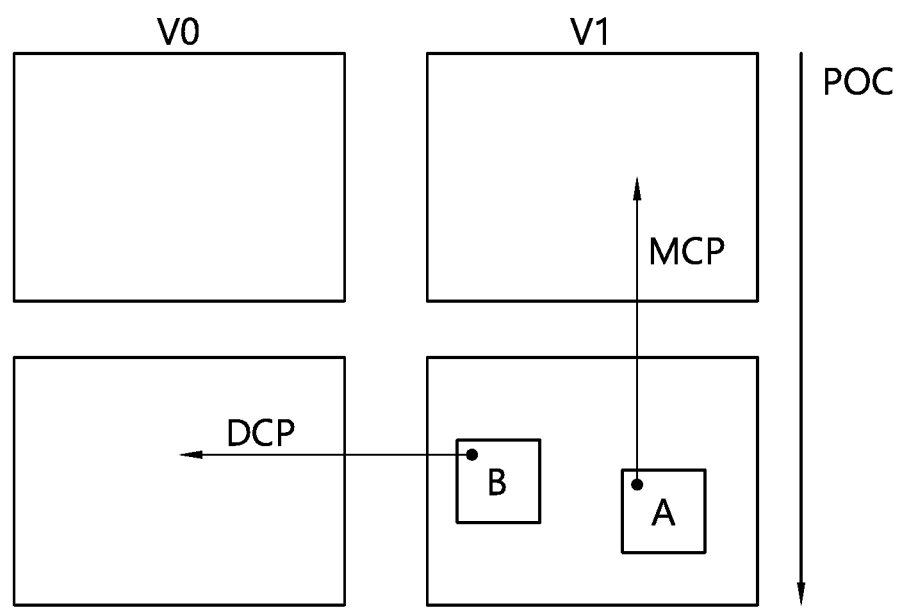
FIG. 4 is a diagram for schematically describing one example of multi-view video coding to which the present invention is applicable.

FIG. 4 is a diagram for schematically describing one example of multi-view video coding to which the present invention is applicable.

In coding a multi-view video, pictures having different view identifiers (IDs) but having the same POC in one AU are coded according to a predefined view coding order.

For example, as illustrated in FIG. 4, suppose that two views (view V0 and view V1) are coded in order of view V0 and view V1. In this case, V0 which is first coded in the AU may be coded without referring other views and V0 becomes a base view on an independent view and V1 which is coded next becomes a dependent view.

The base view is coded with reference to a picture belonging to the base view, not another view. The dependent view is coded following the base view with reference to another view that is already coded.

In multi-view video coding, inter prediction for a coding unit (CU) belonging to the dependent view may be performed with reference to an already coded picture. Here, a method of performing prediction with reference to a picture having the same view ID is referred to as motion compensated prediction (MCP), while a method of performing prediction with reference to a picture with a different view ID in the same AU is referred to as disparity compensated prediction (DCP).

For example, referring to FIG. 4, block A may induce prediction samples by performing the MCP based on the motion vector by referring to a picture which belongs to the same view V1 thereas. Block B may induce the prediction samples by performing the DCP based on the disparity vector by referring to a picture of a different view V0 from the block B in the same AU. In coding the multi-view video, the picture of the different view may be used and the depth map of the same view may be used.

For example, when the prediction samples are induced by performing the DCP, the disparity vector is added to a position (x, y) of a corresponding picture in the reference view corresponding to a position (x, y) of the prediction sample in the current block to determine the position of the reference sample of the corresponding picture in the reference view. The prediction sample may be induced based on the reference sample in the reference view. As one example, the disparity vector may have only an x-axis component. In this case, the disparity vector may be (disp, 0) and the position (xr, y) of the reference sample may be determined as (x+disp,y). Herein, disp represents a value of the disparity vector.

According to the present invention, as one example, the disparity vector may be derived from neighboring blocks. In this case, spatial or temporal neighboring blocks are searched with respect to each CU to induce the disparity vector. Herein, the spatial or temporal neighboring blocks may be neighboring blocks coded based on the DCP. When an initial disparity vector is found according to a predetermined search order, a disparity vector derivation process ends. The disparity vector derived from the neighboring blocks may be called a disparity vector from neighboring blocks (NBDV).

Figure 5:
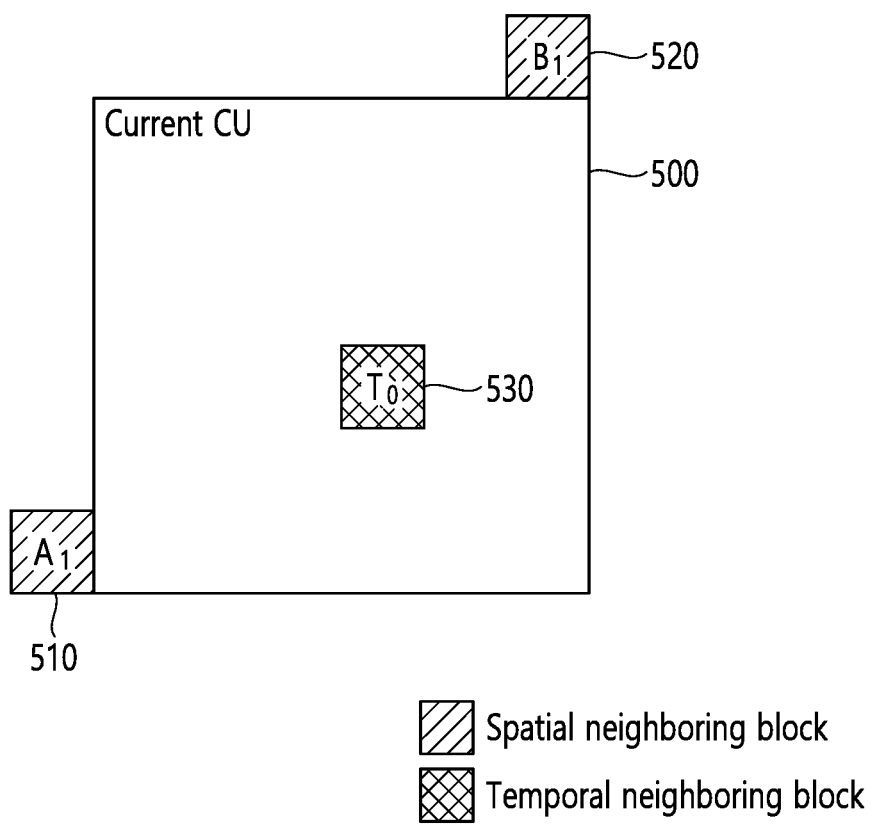
FIG. 5 exemplarily illustrates spatial and temporal neighboring blocks to which the present invention is applicable.

FIG. 5 exemplarily illustrates spatial and temporal neighboring blocks to which the present invention is applicable.

Referring to FIG. 5, $A_1$ 510 and $B_1$ 520 represent the spatial neighboring blocks of a current CU 500 and $T_0$ 530 represents the temporal neighboring block of the current CU 500. $A_1$ 510 and $B_1$ 520 may be positioned on the current picture and $T_0$ 530 may be positioned on the reference picture. $A_l$ 510 is a left neighboring block of the current CU 500 and $A_2$ 510 is a right neighboring block of the current CU 500. In detail, for example, $A_1$ 510 may be a lowermost neighboring block among neighboring blocks adjacent to a left boundary of the current CU 500 and $A_2$ 510 may be a rightmost neighboring block among neighboring blocks adjacent to an upper boundary of the current CU 500.

The disparity vector of the current CU 500 may be derived based on $A_1$ 510, $B_1$ 520, and $T_0$ 530 and $A_1$ 510, $B_1$ 520, and $T_0$ 530 may be searched according to a predetermined search order.

For example, the temporal neighboring block $T_0$ 530 may be first searched and when the disparity vector may not be found based on the temporal neighboring block, the spatial neighboring blocks $A_1$ 510 and $B_1$ 520 may be searched next. In addition, last, the neighboring block coded based on the MCP may be searched. In this case, the disparity vector used when predicting a temporal inter-view motion vector may be searched. When the disparity vector may not be found from the neighboring blocks through such a process, a zero disparity vector may be designated as the disparity vector of the current block CU. In this case, the zero disparity vector may point out an inter-view reference picture (a block or sample in the corresponding reference picture) having a smallest index in the reference picture list.

Among the spatial neighboring blocks, for example, $A_1$ 510 and $B_1$ 520 may be searched in order.

Meanwhile, in searching the temporal neighboring block, a maximum of two reference pictures may be used for the search. A first candidate picture may be a collocated picture used for temporal motion vector prediction. The collocated picture may be indicated from a slice header. A second candidate picture may be derived based on an ascending order of the reference picture index in the reference picture list and added to a candidate list. For example, the second candidate picture may be derived by methods given below.

1) The NBDV is found in a random access point (RAP) picture. When the RAP picture exists in the candidate list for the second candidate picture, the derivation process is completed. When the RAP picture is not available for the current picture, next step 2) is performed.

2) A picture having a smallest temporal ID (TID) among temporal reference pictures is derived as the second candidate picture and when the picture having the smallest TID is unique, the derivation process is completed. When images having the same TID exist in the candidate list, next step 3) is performed.

3) When two or more reference pictures having the same TID exist, a picture showing a smallest picture order count (POC) difference from the current picture is derived as the second candidate picture.

The second reference picture deriving process may be regarded as a process that selects a reference picture estimated to have a lot of disparity vectors. The second reference picture deriving process may be performed for each slice and performed only once for each slice.

With respect to the respective candidate pictures, for example, one temporal candidate block is searched like $T_0$ 530.

Meanwhile, in addition to the neighboring blocks coded based on the DPC, the neighboring blocks coded based on the MCP may be used for the disparity derivation process.

Figure 6:
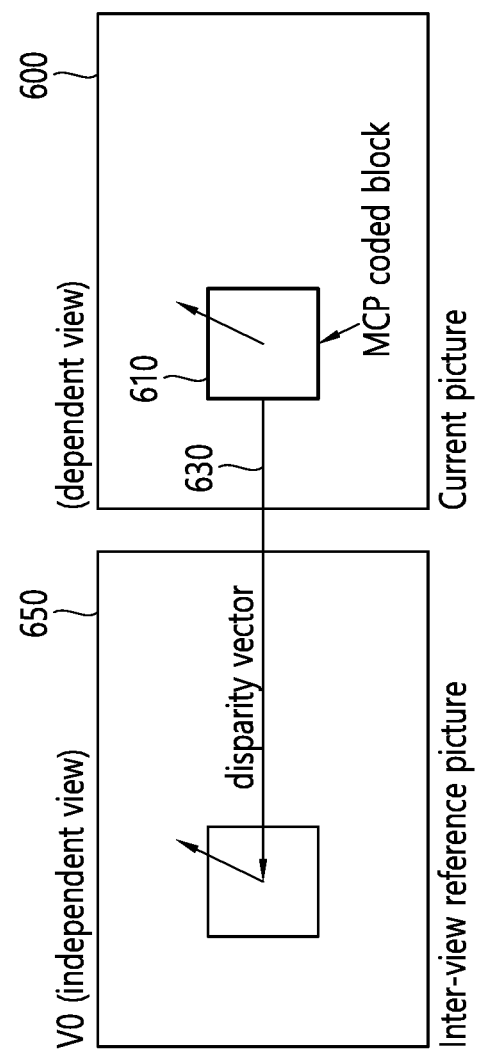
FIG. 6 illustrates an example of deriving a disparity from an MCP-coded neighboring block.

FIG. 6 illustrates an example of deriving a disparity from an MCP-coded neighboring block.

Referring to FIG. 6, when a neighboring block 610 is coded with the MCP and the motion vector of the neighboring block 610 is predicted by the inter-view motion prediction, a disparity vector 630 used for the inter-view motion prediction may represent the motion vector between a current picture 600 and an inter-view reference picture 650. This type of motion vector may be called an inter-view predicted motion vector (IvpMv) and the neighboring block 610 may be called a DV-MCP block.

Three variables given below may be used in order to indicate whether the block is the DV-MCP block and store the disparity vector used for the inter-view motion prediction.

ivpMvFlag
ivpMvDisparityX
refViewIdx

A block which is coded in a merge/skip mode and has an index of 0 is selected among the neighboring blocks. In this case, ivpMvFlag is set to 1 and v and reViewIdx are set to the disparity vector used for the inter-view motion prediction and an associated view order index, respectively.

The disparity vector may be derived from MV-MCP blocks coded in the skip mode. When the block is coded in the skip mode, a motion vector difference (MVD) or residual data is not signaled and this represents that the DV-MCP block coded in the skip mode has a more accurate (alternatively, a more appropriate) disparity vector than the DV-MVP block which is not coded in the skip mode.

When the DCP-coded block may not be found from the spatial and temporal neighboring blocks (that is, when the spatial NBDV or the temporal NBDV may not be found), the DV-MCP block coded in the skip mode may be searched in the neighboring block of the current CU.

Figure 7:
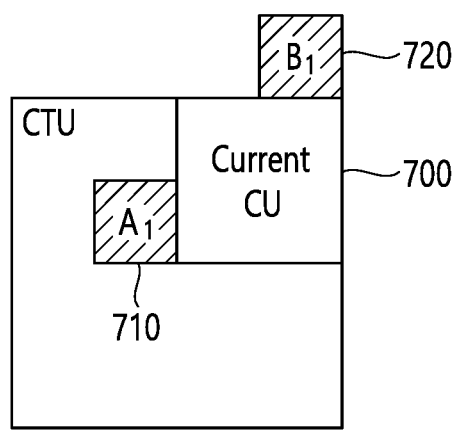
FIG. 7 exemplarily illustrates DV-MCP blocks which may be used in deriving a disparity vector.

FIG. 7 exemplarily illustrates DV-MCP blocks which may be used in deriving a disparity vector.

Referring to FIG. 7, $A_1$ 710 and $B_1$ 720 represent DV-MCP (spatial) neighboring blocks of a current CU 700. The disparity vector of the current CU 700 may be derived based on $A_1$ 710 and $B_1$ 720 which are the MV-MCP neighboring blocks coded in the skip mode and in this case, for example, $A_l$ 710 and $B_1$ 720 may be searched (alternatively, scanned) in order. When the MV-MCP neighboring block is coded in the skip mode, ivpMvDisparityX and reViewIdx associated with the corresponding neighboring block are returned to the derived disparity vector and the view order index and the disparity vector derivation vector is completed. Meanwhile, in order to reduce a memory amount required for deriving the disparity vector from the DC-MCP blocks, $B_1$ 720 may be utilized only when $B_1$ 720 is positioned in a current coding tree unit (CTU) as illustrated in FIG. 7. That is, in this case, only the spatial neighboring block $A_1$ 710 may be utilized.

When there is no available DV in the neighboring blocks even through the disparity vector derivation process, if a default view is defined, a zero vector mapped to the default view as a default disparity vector may be used as the disparity vector. The default disparity vector may be handled as the NBDV during a DoNBDV process to be described below.

Meanwhile, the disparity vector induced through the NBDV derivation process is selected among various disparity vector candidates induced from the neighboring block for the current CU according to a specific criterion. This maps a position of a block in the inter-view reference picture among the blocks in the inter-view reference picture having a smallest difference from the neighboring block and may be different from an ideal disparity vector to be actually acquired. Further, since the method is used on the assumption that a characteristic of the neighboring block is similar to the characteristic of the current block, when the characteristic of the block inducing the disparity vector shows a low similarity to the characteristic of the current CU block, accuracy of the disparity vector may also be low. The disparity derived based on the neighboring block may have low accuracy to be used as the disparity for the current CU and in order to remedy such a disadvantage, the disparity may be corrected or compensated by using a depth map which has already been decoded.

At the time of coding a texture of a dependent view, a decoded depth map of the reference view (for example, a base view) may be used. The derivation of the disparity vector required for coding the texture of the dependent view may be improved by using the depth map of the reference view. That is, the NBDV may be corrected based on the depth map and this may be called depth-oriented disparity vector derivation (DoNBDV). According to the DoNBDV, the disparity vector of the current CU may be corrected through processes given below.

1) The disparity vector is derived through an NBDV derivation process.

2) The disparity vector is used in order to indicate the position of the corresponding block in the coded depth map of the reference view having a view order index which is the same as the view order index associated with the disparity vector. When the corresponding block is positioned outside or on a boundary of the depth map, samples of the corresponding block positioned outside based on the boundary of the depth map are clipped and samples positioned samples are maintained.

3) The depth block at a corresponding position in the reference view is assumed as a virtual depth block for the current block of the dependent view.

4) A maximum depth value of four corner samples of the virtual depth block is found.

5) The maximum depth value is switched to the disparity.

Figure 8:
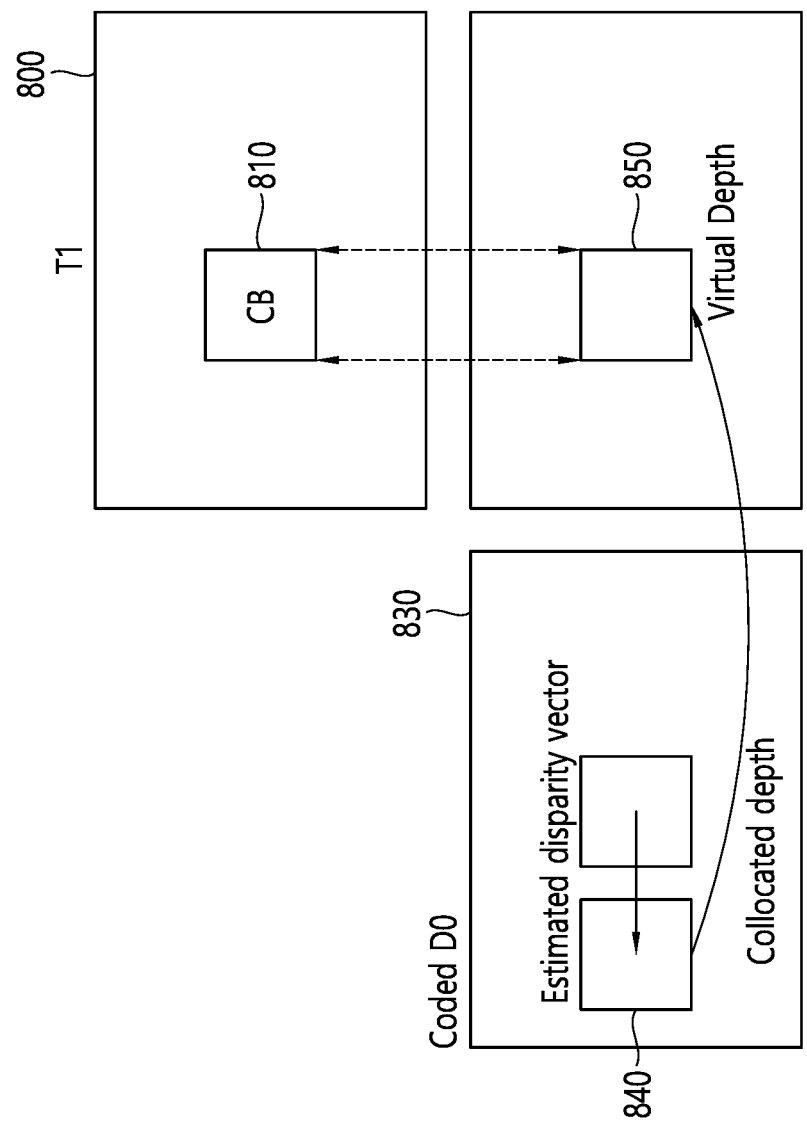
FIG. 8 illustrates an example of finding a virtual depth block.

FIG. 8 illustrates an example of finding a virtual depth block.

Referring to FIG. 8, a coded depth map in view 0 (view index 0) is expressed as Coded D0 830 and a texture to be coded is expressed as T1 800. For a current block (CB) 810, a depth block 840 in Coded D0 830 may be derived by using the disparity vector estimated through the NBDV and a virtual depth block 850 may be derived based on a corresponding position of the depth block 840. A depth value of a sample having the maximum depth value among four corner samples of the virtual depth block 850 may be switched to the corrected disparity vector.

Meanwhile, in the multi-view video coding, in order to increase the coding efficiency of the residual signal, residual prediction for the current block may be performed by using a residual correlation between the views. That is, in the multi-view video coding, the residual prediction may be performed in addition to the intra/inter prediction and the inter-view prediction for the current block. The residual prediction may be called advanced residual prediction (ARP).

Figure 9:
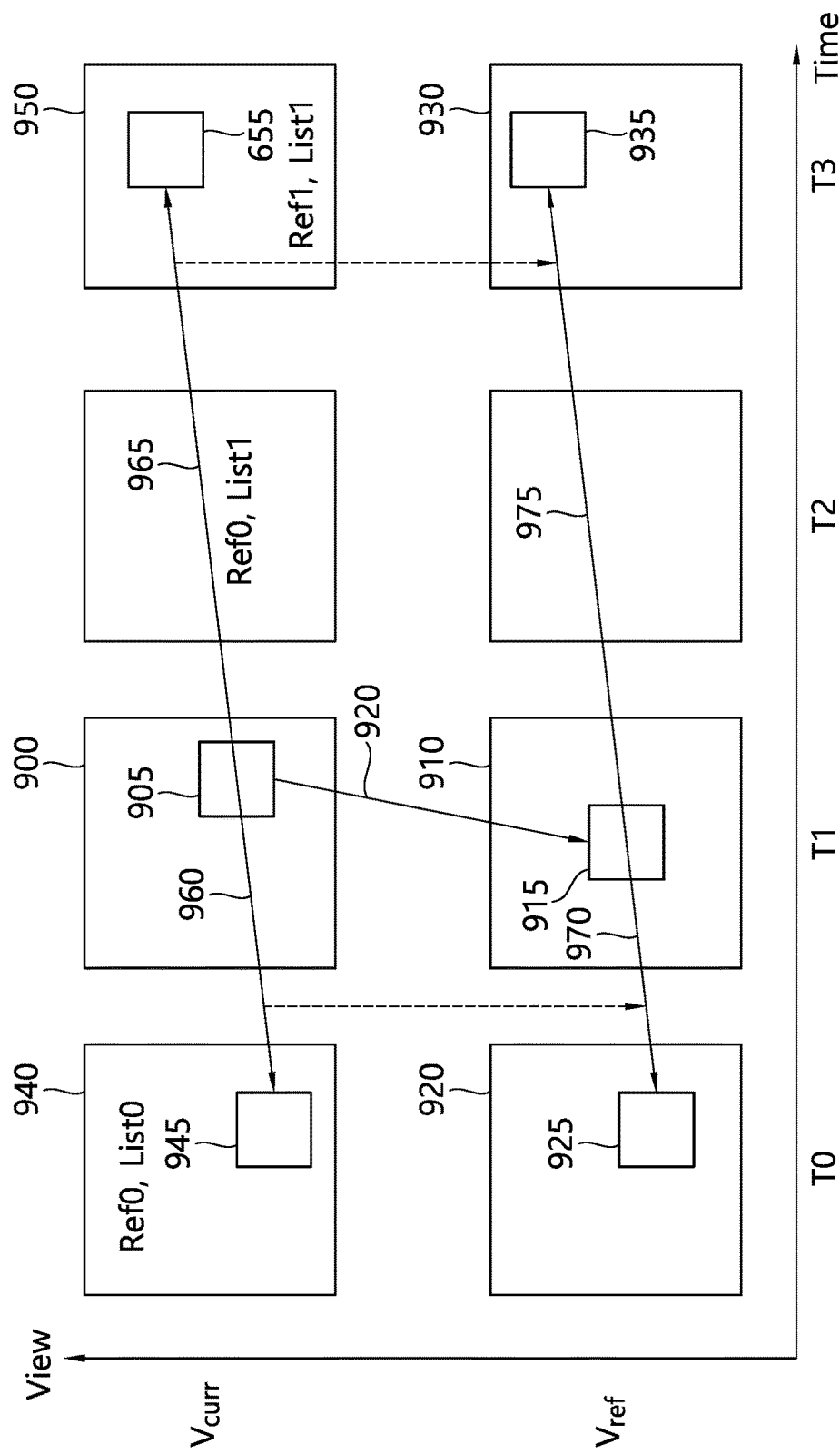
FIG. 9 schematically illustrates a method of residual prediction according to an embodiment of the present invention.

FIG. 9 schematically illustrates a method of residual prediction according to an embodiment of the present invention. The residual prediction method may be performed by the video encoding apparatus of FIG. 2 and the video decoding apparatus of FIG. 3. In more detail, the residual prediction method may be performed by the prediction unit of each of the video encoding apparatus and the video decoding apparatus.

Referring to FIG. 9, when a residual of a current block 905 is predicted in a current picture 900 in a current view Vcurr, the reference blocks (reference samples) used for the residual prediction of the current block 905 may be induced and residual prediction samples for the current block 905 may be generated based on the residual of the induced reference blocks.

Herein, the reference blocks for the residual prediction may vary depending on (1) whether the current block 905 is in inter prediction predicted from a temporal reference picture or (2) whether the current block is in inter-view prediction predicted from an inter-view reference picture.

First, the residual prediction method is described when the current block 905 is in the inter prediction.

When the current block 905 is inter-predicted, the prediction unit first induces a corresponding block 915 in a reference view Vref corresponding to the current block 905. The corresponding block 915 may be induced from a picture 910 which belongs to the reference view of the current block 905 among pictures in the same AU as the current block 905. The position of the corresponding block 915 may be specified by using a disparity vector in the picture which belongs to the reference view.

In this case, the corresponding block 915 may be used as a first reference block (a residual prediction block, rpBlock, or rpSamples) for the residual prediction of the current block 905.

Next, the prediction unit induces a reference picture 920 or 930 of the corresponding block 915 in the reference view and induces a reference block 925 or 935 from the induced reference picture 920 or 930 of the corresponding block 915.

In this case, the reference block 925 or 935 may be used as a second reference block (a residual prediction reference block, rpRefBlock, or rpRefSamples) for the residual prediction of the current block 905.

The reference picture 920 or 930 of the corresponding block 915 may be a picture having the same POC value as a reference picture 940 or 950 of the current block 905 in the current view or the reference picture in the reference picture list used for the residual prediction of the current block 905.

The reference block 925 or 935 of the corresponding block 915 may be specified by performing motion compensation by using motion information of the current block 905, for example, a motion vector 960 or 965 of the current block 905 in the reference picture 920 or 930 of the corresponding block 915.

Herein, the reference picture 940 of the current block 905 is a picture which may be referred in a forward direction during the inter-prediction and for example, a picture specified by a reference picture index Ref0 in a reference picture list L0.

The reference picture 950 of the current block 905 is a picture which may be referred in a backward direction during the inter-prediction and for example, a picture specified by a reference picture index Ref1 in a reference picture list L1.

The prediction unit may use a difference between the first reference block reBlock and the second reference block rpRefBlock induced for the residual prediction as a residual prediction sample value of the current block 905. For example, a difference value acquired by subtracting a sample value of the reference block 925 or 935 from the sample value of the corresponding block 915 may be induced as the residual prediction sample value of the current block 905.

When the residual prediction is applied, a prediction sample value of the current block 905 may be modified based on the residual prediction sample value of the current block 905. In this case, a weighting factor may be applied to the residual prediction sample value of the current block 905. The weighting factor may be transmitted from an encoder to a decoder and for example, the weighting factor may be called iv_res_pred_weight_idx.

The weighting factor may be, for example, one value of 0, 0.5, and 1. The weighting factor of 0 may indicate that the residual prediction is not applied. Index information indicating which weighting factor is to be applied may be transmitted to the decoder by the unit of the block in encoding.

Next, the residual prediction method is described when the current block 905 is in the inter-view prediction.

When the current block 905 is inter-view-predicted, the prediction unit induces the reference picture 940 or 950 in the current view and induces the reference block 945 or 955 in the reference picture 940 or 950. As one example, the prediction unit may induce the reference block 945 or 955 in the reference picture 940 or 950 based on the induced temporal motion vector and the reference picture index.

In this case, the reference block 945 or 955 may be used as the first reference block (the residual prediction block, rpBlock, or rpSamples) for the residual prediction of the current block 905.

Next, the prediction unit induces the corresponding block 915 in the reference view, which corresponds to the current block 905.

As described above, the corresponding block 915 may be induced from the picture 910 which belongs to the reference view of the current block 905 among the pictures in the same AU as the current block 905. In this case, the position of the corresponding block 915 may be specified by using the disparity vector 920 of the current block 905 in the picture 910 of the reference view.

Next, the prediction unit may induce the reference picture 920 or 930 of the corresponding block 915 and induce the reference block 925 or 935 from the reference picture 920 or 930 of the corresponding block 915.

In this case, the reference block 925 or 935 may be used as the second reference block (the residual prediction reference block, rpRefBlock, or rpRefSamples) for the residual prediction of the current block 950.

The reference picture 920 or 930 of the corresponding block 915 may be the picture having the same POC value as the reference picture 940 or 950 of the current block 905 in the current view or the reference picture in the reference picture list for the reference view used for the residual prediction of the current block 905.

The reference block 925 or 935 of the corresponding block 915 may be specified by performing the motion compensation by using the motion information of the current block 905, for example, the temporal motion vector of the current block 905 in the reference picture 920 or 930 of the corresponding block 915.

Next, the prediction unit may use the difference between the first reference block rpBlcok and the second reference block rpRefBlock induced for the residual prediction as the residual prediction sample value of the current block 915. For example, a difference value acquired by subtracting the sample value of the reference block 925 or 935 in the reference view from the sample value of the reference block 945 or 955 in the current view may be induced as the residual prediction value of the current block 905.

When the residual prediction is applied, the prediction sample value of the current block 905 may be modified based on the residual prediction sample value of the current block 905. In this case, the weighting factor may be applied to the residual prediction sample value of the current block 905 as described above.

As described above, the weighting factor may be, for example, one value of 0, 0.5, and 1. The weighting factor of 0 may indicate that the residual prediction is not applied. The index information indicating which weighting factor is to be applied may be transmitted by the unit of the block.

According to the present invention, encoding/decoding may be performed by using the NBDV and the DONBDV based on various coding tools including the IvMC, VSP, ARP, and the like. In this case, it is checked whether the disparity vector exists with respect to the current block to determine whether the tools are applicable. In this case, the disparity vector, the target (reference) view, and the availability for each CU may be together used. The availability may be called disparity availability and divided into three cases as below.

DISP_AVAILABLE: A case where the NBDV is acquired from the neighboring block

DISP_DEFAULT: A case where the NBDV does not exist, but the default view is designated and a zero vector (default vector) is used as the disparity vector DISP_NONE: A case where the disparity vector may not be used In this case, as one example, the ARP may be performed only when an availability parameter of the CU is DISP_AVAILABLE. That is, the ARP may be performed only in the case where the NBDV is acquired from the neighboring block.

However, in the coding tool, it may be unnecessary to distinguish whether the current derived disparity vector is the NBDV or the zero vector on the default view and as one example, even when depth refinement is performed with respect to the disparity vector candidate is performed based on the corresponding depth block, the coding is performed by refining the disparity vector regardless of the NBDV or the default vector on the default view. However, when the ARP is performed only in the case where the NBDV derived from the neighboring block exists, the ARP is performed if the NBDV found from the neighboring block is the zero vector, but the ARP is not performed if the NBDV is the default disparity vector. The mismatch is prevented and the ARP may be performed even when the default disparity vector is used to enhance prediction and coding efficiency for the current block.

Accordingly, according to the present invention, the DISP_DEFAULT is regarded as DISP_AVAILABLE. In this case, information (a flag) indicating the disparity availability may indicate not three existing cases but only two cases. For example, according to the present invention, assumed that the flag indicating the disparity availability is DispAvailFlag, when the default view is set, DispAvailFlag may be set to 1. Further, for example, according to the present invention, when the NBDV is available, dvAvailFlag may be set to 1 and when the dvAvailFlag is 0, the reference view index for the current block may be set as the default view index and the disparity vector may be set to the zero vector (0, 0).

In detail, for example, when RpRefPicAvailFlag indicating the availability of the reference picture for the residual prediction exists, the ARP may be performed and when the DispAvailFlag is 1, the RpRefPicAvailflag may have a value of 1. When RpRefPicAvailflag is 1, iv_res_pred_weight_idx which is the weighting factor for the residual prediction may be signaled and when the iv_res_pred_weight_idx for the current block is not 0, the ARP may be applied.

That is, according to the present invention, even when the NBDV derived from the neighboring block does not exist with respect to the current block, the default view may be set and when the disparity vector of the current block is derived based on the default view and the default vector (zero vector), the ARP may be performed with respect to the current block.

Figure 10:
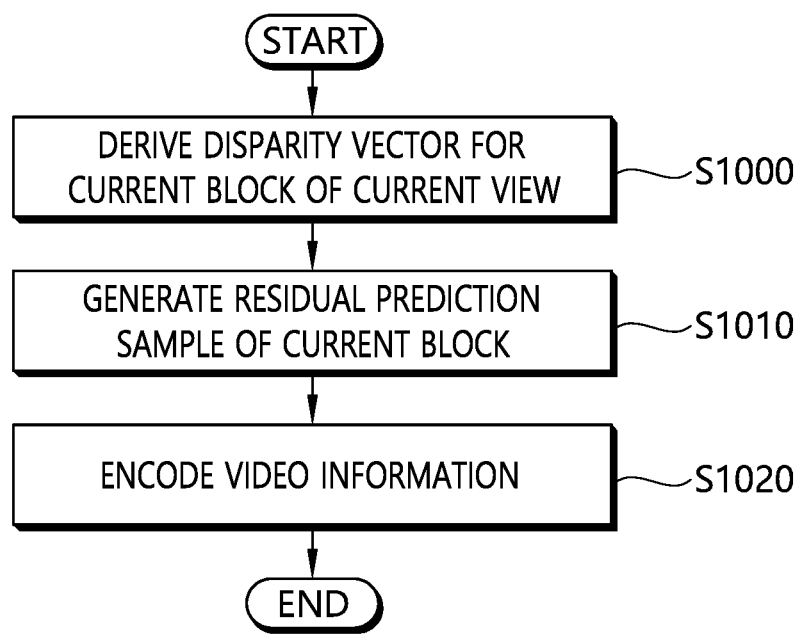
FIG. 10 is a flowchart schematically illustrating an encoding method using residual prediction according to an embodiment of the present invention.

FIG. 10 is a flowchart schematically illustrating an encoding method using residual prediction according to an embodiment of the present invention.

Referring to FIG. 10, the encoding apparatus derives the disparity vector for the current block of the current view (S1000). The encoding apparatus may derive the disparity vector based on the NBDV derivation method. In this case, the encoding apparatus may correct the disparity vector based on the DoNBDV method. Alternatively, when the NBDV is not available and the default view is set, the encoding apparatus may derive the zero vector on the default view as the disparity vector for the current block.

The encoding apparatus generates the residual prediction sample of the current block (S1010). The residual prediction sample may be generated by the unit of the CU. In this case, the current block may be a CU block or a coding block (CB). Meanwhile, the CU may be partitioned into one or a plurality of PUs and accordingly, the current block may include the PU.

According to the present invention, in the case where the disparity vector for the current block is derived based on the zero vector on the default view as well as the case where the disparity vector for the current block is derived based on the NBDV, the residual prediction sample may be generated. That is, according to the present invention, even in the case where the disparity vector for the current block is not derived from the neighboring block, the default view is used as the reference view, and the zero vector is used as the disparity vector, a residual prediction operation may be performed. The encoding apparatus may generate the residual prediction sample of the current block based on the residual prediction operation.

The encoding apparatus may encode video information for video decoding (S1020). The encoding apparatus may entropy-encode the video information and output the encoded video information as a bitstream. The output bitstream may be transmitted through a network or stored in a storage medium. The video information may include (for example, a weighting factor index for the residual prediction) for performing the residual prediction. The video information may include residual information for the current block and values of syntax elements for restoring the current block.

Figure 11:
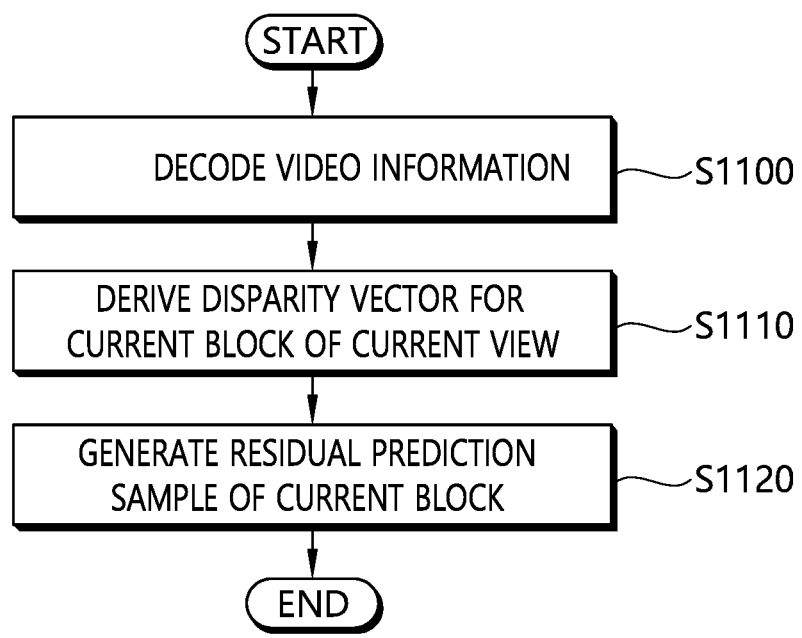
FIG. 11 is a flowchart schematically illustrating a decoding method using residual prediction according to an embodiment of the present invention.

FIG. 11 is a flowchart schematically illustrating a decoding method using residual prediction according to an embodiment of the present invention.

The decoding apparatus may decode the video information included in the bitstream (S1100). The decoding apparatus may entropy-decode the bitstream and acquire the video information. The video information may include the residual information for the current block and the values of the syntax elements for restoring the current block.

For example, the decoding apparatus may decode information on a prediction mode applied to the current block and decode the weighting factor index for the residual prediction.

The decoding apparatus derives the disparity vector for the current block of the current view (S1110). The decoding apparatus may derive the disparity vector based on the NBDV derivation method. In this case, the decoding apparatus may correct the disparity vector based on the DoNBDV method. Alternatively, when the NBDV is not available and the default view is set, the decoding apparatus may derive the zero vector on the default view as the disparity vector for the current block.

The decoding apparatus generates the residual prediction sample of the current block (S1120). The residual prediction sample may be generated by the unit of the CU. In this case, the current block may be the CU block or the coding block (CB). Meanwhile, the CU may be partitioned into one or a plurality of PUs and accordingly, the current block may include the PU.

According to the present invention, in the case where the disparity vector for the current block is derived based on the zero vector on the default view as well as the case where the disparity vector for the current block is derived based on the NBDV, the residual prediction sample may be generated. That is, according to the present invention, even in the case where the disparity vector for the current block is not derived from the neighboring block, the default view is used as the reference view, and the zero vector is used as the disparity vector, the residual prediction operation may be performed. The encoding apparatus may generate the residual prediction sample of the current block based on the residual prediction operation.

The decoding apparatus may generate a modified prediction sample for the current block based on the pre-generated prediction sample and the residual prediction sample with respect the current block and may generate a restoration block (and a restoration picture) based on the modified prediction sample and the residual sample. For example, in this case, the prediction sample may be derived by the unit of PU or prediction block (PB) and the residual prediction sample may be derived by the unit of the CU or CB. The residual prediction sample generated by the unit of the CU may be partitioned by the unit of the PU, therefore, the prediction sample modified based on the prediction sample and the residual prediction sample may be generated by the unit of the PU. The decoding apparatus may generate the restoration block by adding the residual sample to the modified prediction sample.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation, and do not intend to limit technical scopes of the present invention. Therefore, the scope of the invention should be defined by the appended claims.

When the above-described embodiments are implemented in software in the present invention, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A residual prediction method comprising:
receiving information on a residual prediction for a current block through a bitstream,
wherein the information on the residual prediction for the current block includes weighting factor information for a residual prediction sample for the current block,
wherein the weighting factor information is received while being included in the information on the residual prediction for the current block when a disparity vector is determined based on neighboring blocks of the current block or determined to a zero vector, and
wherein when the weighting factor information does not indicate 0, the residual prediction for the current block is performed based on the weighting factor information;
determining an availability of a neighboring block disparity vector (NBDV) based on the neighboring blocks of the current block of a current picture;
determining a disparity vector for the current block to the zero vector when the NBDV is unavailable and a reference view for a current view comprising the current block is determined to a preset default reference view;
determining a value of first flag information, which indicates availability of the disparity vector for the current block, to 1 when the NBDV is unavailable and the disparity vector for the current block is determined to the zero vector;
determining to perform the residual prediction on the current block based on the value of the first flag information which is equal to 1, wherein the residual prediction is a prediction process for a residual signal; and
performing the residual prediction on the current block based on the preset default reference view and the disparity vector for the current block.

2. The method of claim 1, wherein the current block is a coding unit (CU) block, and
the performing the residual prediction on the current block comprises generating a residual prediction sample for the current block based on a reference picture in the preset default view.

3. The method of claim 1, wherein the generating the modified prediction sample for the current block comprises generating the modified prediction sample for the current block based on the normal prediction sample for the current block and a modified residual prediction sample for the current block which is a result of multiplying a value indicated by the weighting factor information with the residual prediction sample for the current block.

4. The method of claim 2, further comprising:
generating a normal prediction sample for the current block by performing inter prediction or inter-view prediction for the current block; and
generating a modified prediction sample for the current block based on the normal prediction sample for the current block and the residual prediction sample for the current block.

5. The method of claim 2,
wherein a first reference picture comprising a first reference block and a second reference picture comprising a second reference block are present in the reference view, and
wherein the generating the residual prediction sample for the current block based on the reference picture comprises generating the residual prediction sample for the current block of the current picture by subtracting a sample value of the second reference block from a sample value of the first reference block.

6. The method of claim 4, wherein the residual prediction sample for the current block is generated with respect to the CU block, and
the CU block is partitioned into one or a plurality of prediction unit (PU) blocks and the normal prediction sample for the current block and the modified prediction sample for the current block are generated with respect to the one or plurality of PU blocks.

7. The method of claim 5, wherein the first reference picture is determined from among pictures which are in a same Access Unit (AU) as the current block and comprised in the preset default reference view, and the first reference block is determined in the first reference picture based on the disparity vector, and
wherein the second reference picture is a reference picture for the first reference block in the preset default reference view, and the second reference block is determined in the second reference picture based on the current block.

8. The method of claim 5, wherein the first reference picture is a reference picture in the current view, and the first reference block is determined in the first reference picture,
wherein the second reference picture is a reference picture of a corresponding block comprised in a corresponding picture which is in a same Access Unit (AU) as the current block and comprised in the preset default reference view, and the second reference block is determined in the second reference picture based on the current block, and
wherein the corresponding block is determined in the corresponding picture based on the disparity vector.

9. The method of claim 8, wherein the AU indicates a set of pictures having a same Picture Order Count (POC).

10. The method of claim 4, further comprising:
reconstructing the current picture based on the modified prediction sample for the current block.

11. The method of claim 2, wherein second flag information indicating availability of the reference picture indicates 1 when the residual prediction is performable on the current block based on the reference picture, and the second flag information indicates 0 when the residual prediction is not performable on the current block based on the reference picture.

12. The method of claim 11, wherein third flag information indicating whether the disparity vector for the current block is derivable from the neighboring blocks indicates 1 when the disparity vector is derived from the neighboring blocks of the current block, and the third flag information indicates 0 when the disparity vector is not derivable from the neighboring blocks of the current block and the disparity vector is determined to the zero vector.

13. The method of claim 12, wherein the first flag information indicates 1 regardless of whether the third flag information indicates 0 or 1.

14. A residual prediction apparatus, comprising:

an entropy decoder configured to:

receive information on a residual prediction for a current block through a bitstream, wherein the information on the residual prediction for the current block includes weighting factor information for a residual prediction sample for the current block, wherein the weighting factor information is received while being included in the information on the residual prediction for the current block when a disparity vector is determined based on neighboring blocks of the current block or determined to a zero vector, and wherein when the weighting factor information does not indicate 0, the residual prediction for the current block is performed based on the weighting factor information, determine an availability of a neighboring block disparity vector (NBDV) based on the neighboring blocks of the current block of a current picture, determine a disparity vector for the current block to the zero vector when the NBDV is unavailable and a reference view for a current view comprising the current block is determined to a preset default reference view, and determine a value of first flag information, which indicates availability of the disparity vector for the current block, to 1 when the NBDV is unavailable and the disparity vector for the current block is determined to the zero vector; and a predictor configured to:

determine to perform the residual prediction on the current block based on the value of the first flag information which is equal to 1, wherein the residual prediction is a prediction process for a residual signal, and perform the residual prediction on the current block based on the preset default reference view and the disparity vector for the current block.

* * * * *